(12) United States Patent  (10) Patent No.: US 9,106,653 B2
Shogaki  (45) Date of Patent: Aug. 11, 2015

(54) DATA PROCESSING SYSTEM AND DATA PROCESSING METHOD (71) Applicant: CANON KABUSHIKI KAISHA, Tokyo (JP)

(72) Inventor: Yohei Shogaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 75 days.

(21) Appl. No.: 13/746,955

(22) Filed: Jan. 22, 2013

(65) Prior Publication Data

US 2013/0205405 A1 Aug. 8, 2013

(30) Foreign Application Priority Data

Feb. 8, 2012 (JP) ................................. 2012-025533

(51) Int. Cl.
H04L 29/06 (2006.01)
(52) U.S. Cl.
CPC ...................... H04L 63/10 (2013.01)
(58) Field of Classification Search
CPC .............. H04L 63/10; H04L 2463/101; H04L 63/0428; G06F 21/10; G06F 21/6218; G06F 21/62; G06F 63/062; G11B 20/00086; G06Q 30/0601; H04N 7/163
USPC ........................................................ 726/27
See application file for complete search history.

(56) References Cited

U.S. PATENT DOCUMENTS

| 7,574,747 | B2 * | 8/2009 | Oliveira et al. | 726/29 |
| 2006/0021057 | A1 * | 1/2006 | Risan et al. | 726/26 |
| 2007/0294645 | A1 * | 12/2007 | Medvinsky et al. | 715/862 |
| 2012/0105903 | A1 * | 5/2012 | Pettis | 358/1.14 |
| 2013/0340085 | A1 * | 12/2013 | Nadell et al. | 726/26 |

FOREIGN PATENT DOCUMENTS

JP 2006-80773 A 3/2006

* cited by examiner

Primary Examiner — Saleh Najjar
Assistant Examiner — Shu Chun Gao
(74) Attorney, Agent, or Firm — Fitzpatrick, Cella, Harper & Scinto

(57) ABSTRACT

Provided is a system that improve security of data processing by determining whether processing of the data received from an image processing apparatus is restricted, communicating with the image processing apparatus when processing of the data is restricted, and receiving a response whether the processing of the data is permitted. It is determined in the portable terminal whether processing of the data received from the image processing apparatus is restricted. If processing of the data is restricted, the portable terminal communicates with the image processing apparatus, and the portable terminal processes data when it received information that indicates the processing of the data is permitted. If processing of the data is restricted, the portable terminal processes the data without communicating with the image processing apparatus.

8 Claims, 5 Drawing Sheets

| FIELD | VALUE | |
|---|---|---|
| 301 — FILE NAME | abc.png | META DATA |
| 302 — CREATION DATE AND TIME | 20YY/MM/DD | |
| 303 — SECURITY SETTING | YES | |
| 304 — DEVICE SPECIFYING INFORMATION | 192.168.0.XX | |
| 305 — IMAGE DATA | | |

DATA PROCESSING SYSTEM AND DATA PROCESSING METHOD

BACKGROUND OF THE INVENTION

1. Field of the Invention

The present invention relates to a data processing system and a data processing method, in which a server that transmits data, such as an image processing apparatus, and a terminal that receives the data, such as a portable terminal, are communicatively connected to each other via a network.

2. Description of the Related Art

Conventionally, a system has been proposed in which a server device measures the distance to a portable terminal and, when it is determined that the portable terminal is located in proximity to the server device, the server device processes data for preview or the like and transmits it to the portable terminal (see, for example, Japanese Patent Laid-Open No. 2006-80773).

However, in the system described in Japanese Patent Laid-Open No. 2006-80773, even if data to be provided by the server is data whose treatment is restricted, the server device processes the data for preview or the like and transmits it when it is determined that the server device and the portable terminal are located in proximity to each other, which causes a problem in security of data processing.

SUMMARY OF THE INVENTION

The present invention provides a data processing system and a data processing method in which it is determined whether or not the transmitted data is data whose processing is restricted, a terminal communicates with an image processing apparatus that has transmitted the data when the data is data whose processing is restricted, and receives a response whether or not the processing of the data is permitted, thereby improving security of data processing.

According to an aspect of the present invention, a data processing system wherein a server and a terminal are connected to each other, the server comprising: a transmitting unit configured to transmit data to the terminal; and a responding unit configured to respond to an inquiry from the terminal whether or not predetermined processing of the data is permitted, the terminal comprising: a receiving unit configured to receive the data from the server; a determining unit configured to determine whether or not the data received by the receiving unit is data whose processing is restricted; and a process controller configured to inquire of the server whether or not the predetermined processing is permitted, if it is determined by the determining unit that the data is data whose processing is restricted, and to perform or not perform the processing in accordance with a response to the inquiry.

According to the present invention, it is determined whether or not data that is received from a server is data whose processing is restricted, a terminal communicates with the server when the data is data whose processing is restricted, and the terminal receives a response whether or not the processing of the data is permitted, thereby enabling to improve security of data processing.

Further features of the present invention will become apparent from the following description of exemplary embodiments with reference to the attached drawings.

DESCRIPTION OF THE EMBODIMENTS

An embodiment for implementing the invention will be described below in detail with reference to the drawings. In the present embodiment, an image processing apparatus is taken as an example of a device for transmitting data, a portable terminal is taken as an example of a device for receiving data, and image data is taken as an example of data to be transmitted and received.

Note that, in the present embodiment, the image processing apparatus is a computer, such as a personal computer or a server device, and the portable terminal is a terminal that is portable, such as a notebook computer or a smartphone, but not a stationary terminal. However, any apparatus can be used as the image processing apparatus of the present embodiment, provided that it has the functionality of a server that provides image data such as a still image and the functionality described in the present embodiment. Further, with respect to the portable terminal, any terminal or other apparatus can be used as the portable terminal of the present embodiment, provided that it has functionality for helping a user view the image data provided by the server and the functionality described in the present embodiment.

The present embodiment will also describe the case where the image processing apparatus and the portable terminal are connected to each other via a network, and the portable terminal receives data from the image processing apparatus and subjects the data to predetermined processing such as output processing or treating it for display or the like.

Figure 1:
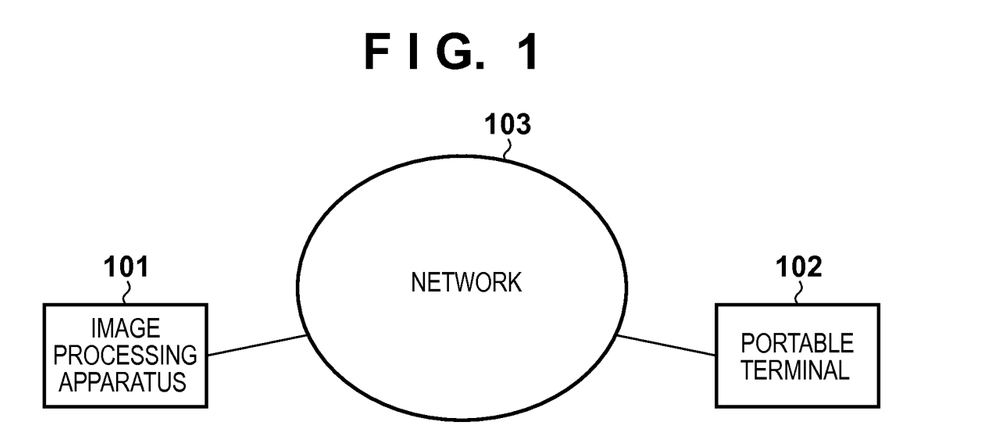
FIG. 1 is a diagram illustrating an example of a configuration of a network system.

An example of a configuration of a network system according to the present embodiment will first be described with reference to FIG. 1. As illustrated in FIG. 1, a portable terminal 102 that has functionality for receiving data and an image processing apparatus 101 that has functionality for transmitting data are connected to a network 103, and configured to be able to communicate with each other.

Figure 2:
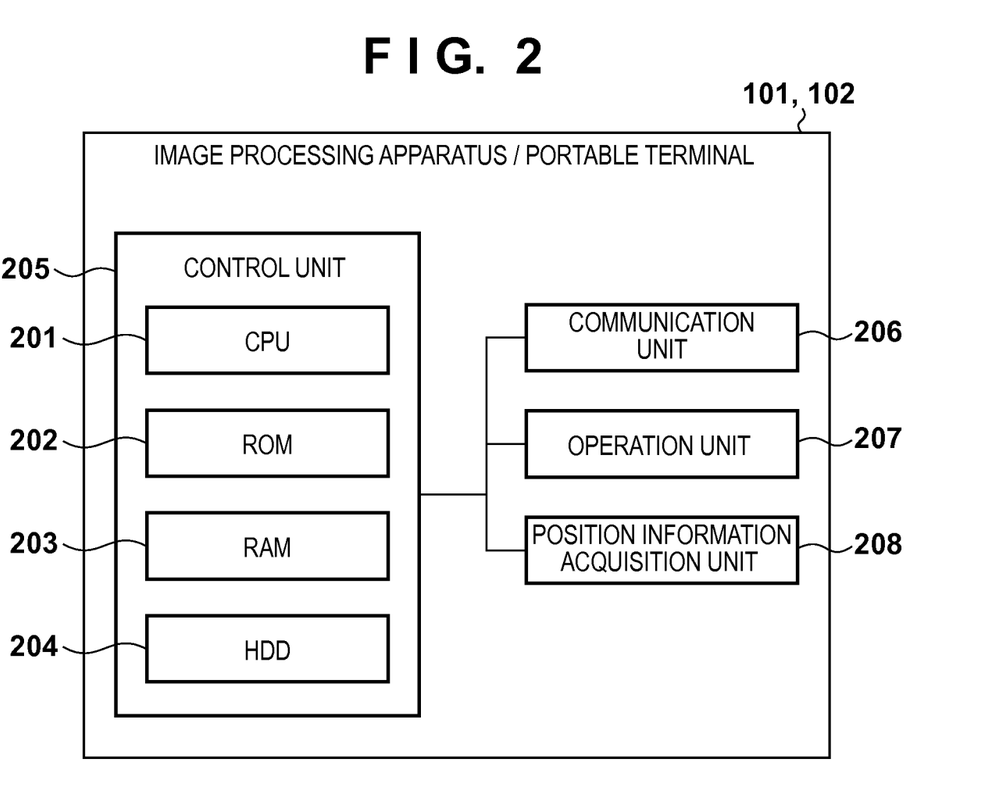
FIG. 2 is a diagram illustrating an example of a configuration of an image processing apparatus (portable terminal).

Now, an example of a configuration of the image processing apparatus 101 will be described in detail with reference to FIG. 2. Note that the portable terminal 102 has the same configuration as that of the image processing apparatus 101, and thus both apparatuses will be described here together.

A control unit 205 includes a CPU 201, a ROM 202, a RAM 203, and an HDD 204, and controls the entire operation of the image processing apparatus 101. The CPU 201 performs various types of control of the image processing apparatus 101, such as read-out control to read out a control program stored in the ROM 202, and communication control. The RAM 203 is used as a temporary storage area of the CPU 201, such as a main memory and a work area. In the HDD 204, data, such as images, and various types of programs are stored. The control unit 205 exchanges via an interface (not illustrated) information with each of a communication unit 206, an operation unit 207, and a position information acquisition unit 208.

The operation unit 207 includes a liquid crystal display unit having a touch panel function, a keyboard, or the like. The communication unit 206 is connected to the network 103 via an interface (not illustrated), and transmits and receives data to and from the portable terminal 102 or another device that is connected to the network 103. The communication unit 206 may be connected, with or without wiring, to a LAN or to the Internet. The position information acquisition unit 208 measures the position of the current location using a GPS that measures positions using orbiting satellites, and outputs the measured position of the current location as position information of the image processing apparatus 101.

Figure 3:
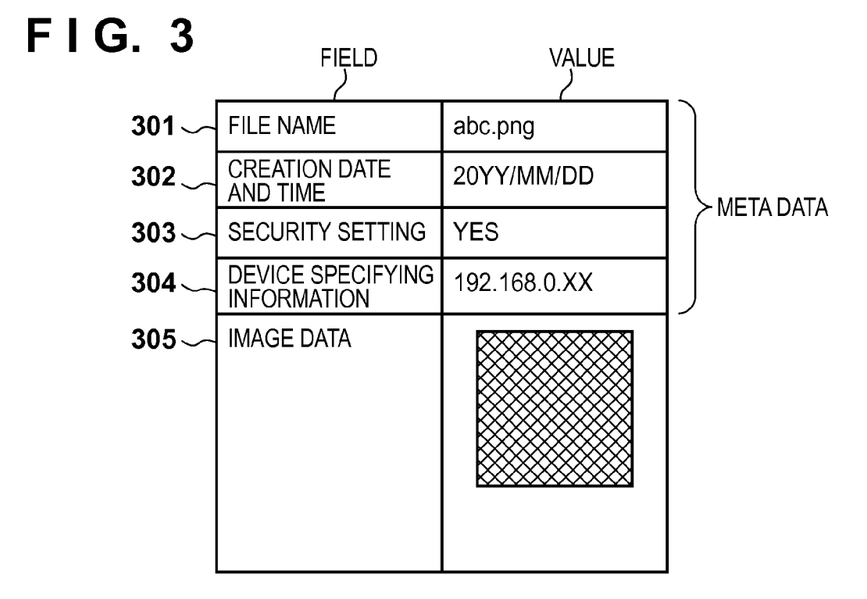
FIG. 3 is a diagram illustrating an example of a structure of image data to be transmitted and received via the network.

An example of a structure of image data to be transmitted and received between the image processing apparatus 101 and the portable terminal 102, which have the above-mentioned configurations, will be described with reference to FIG. 3. As illustrated in FIG. 3, the image data includes meta data. The meta data is configured to include at least one field selected from a file name 301, creation date and time 302, and security settings 303, of the data. The security settings 303 indicate, for example, that the display of the meta data and the image data is restricted. In the example of FIG. 3, the value of the security settings 303 is merely "YES", however, each field of the meta data or part thereof, such as the file name, can be set to an individual value with respect to the image data. Further, if the image data 305 can include original image data and preview image data, it is also possible to individually set display restrictions on both types of image data. And, in some situations, device specifying information 304 that will be described later is also included as a field. Each field of the meta data holds, for example, a code that indicates the field and a value of the field.

A field of an image 305 holds an image or pointer information that indicates a place where the image is stored. Further, the image 305 may be configured to include the image data or the preview image data created for preview or both.

Figure 4:
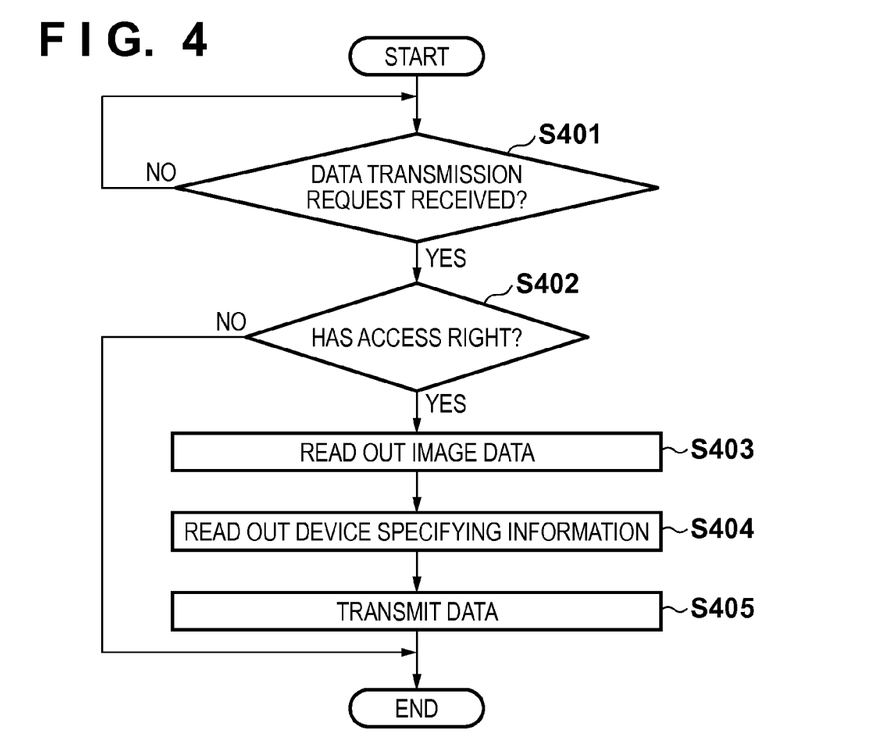
FIG. 4 is a flowchart illustrating data transmission processing performed in the image processing apparatus.

A series of processing steps according to the present embodiment in which the image processing apparatus 101 transmits data will now be described with reference to the flowchart illustrated in FIG. 4. The image processing apparatus 101 transmits data in response to a data transmission request from the portable terminal 102 connected to the image processing apparatus 101 via the network 103.

Note that the processing (procedure illustrated in the flowchart) is processing that is stored in any of the storage areas of the control unit 205, such as the ROM 202, the RAM 203, or the HDD 204, and is executed by the CPU 201.

In step S401, the control unit 205 of the image processing apparatus 101 determines whether or not the image processing apparatus 101 has received a data transmission request via the communication unit 206. If it is determined that the image processing apparatus 101 has received a data transmission request, the procedure advances to step S402, and otherwise, the processing waits in step S401 until the image processing apparatus 101 receives a transmission request.

In step S402, the control unit 205 of the image processing apparatus 101 determines whether or not the portable terminal 102, which has sent the transmission request, has the right to access the requested data, that is, is authorized to receive the data. If it is determined that the portable terminal 102 is authorized to receive the data, the procedure advances to step S403, and otherwise, the series of processing steps end.

In step S403, the control unit 205 of the image processing apparatus 101 reads out from the storage area image data corresponding to the transmission request, and the procedure advances to step S404. In step S404, the control unit 205 of the image processing apparatus 101 reads out the device specifying information 304 with which the position where the image processing apparatus 101 is located on the network 103 can be specified, and the procedure advances to step S405. The device specifying information 304 is information for causing the portable terminal 102 that received data to specify the image processing apparatus 101 that had transmitted the data via the network 103, so that the portable terminal 102 communicates with the image processing apparatus 101. According to the present embodiment, an IP address that is assigned to the image processing apparatus 101 is used as the device specifying information 304, as illustrated in FIG. 3. In step S405, the control unit 205 of the image processing apparatus 101 transmits to the portable terminal 102 the data in which the device specifying information 304 is added to the image data that was read out, and the series of processing steps end.

Figure 6:
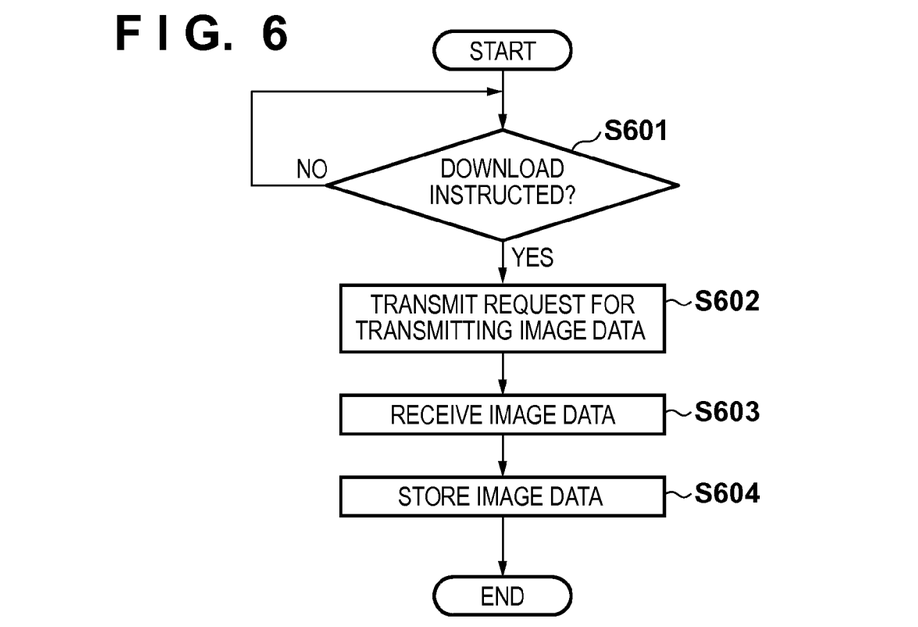
FIG. 6 is a flowchart illustrating data reception processing performed in the portable terminal.

A series of processing steps in which the portable terminal 102 receives the data from the above-mentioned image processing apparatus 101 will be described with reference to the flowchart illustrated in FIG. 6. The portable terminal 102 requests the image processing apparatus 101 to transmit image data in accordance with a user's instruction.

Note that the processing (procedure illustrated in the flowchart) is processing that is stored in any of the storage areas of the control unit 205, such as the ROM 202, the RAM 203, or the HDD 204, and is executed by the CPU 201.

In step S601, the control unit 205 of the portable terminal 102 determines whether or not the user instructed download of the image data via the operation unit 207. If it is determined that the download of the image data was instructed, the procedure advances to step S602, and otherwise, the processing waits in step S601 until the download of the image data is instructed.

In step S602, the control unit 205 of the portable terminal 102 transmits a request for transmitting the image data to the image processing apparatus 101, and the procedure advances to step S603. In step S603, the control unit 205 of the portable terminal 102 receives the image data including the meta data from the image processing apparatus 101, and the procedure advances to step S604.

In step S604, the control unit 205 of the portable terminal 102 stores the image data received from the image processing apparatus 101 in any of the storage areas, such as the RAM 203, the ROM 202, or the HDD 204, and ends the series of processing steps and returns to the original processing.

The image data that is received here may include meta data that includes the device specifying information 304, and alternatively the image data and the device specifying information 304 may be received separately. In this case, the control unit 205 of the portable terminal 102 associates the received image data with the received device specifying information 304.

Further, the data that is received by the portable terminal 102 may be any data that was transmitted from the image processing apparatus 101, and the image processing apparatus 101 may also be configured to read out data stored in a storage area of an apparatus other than the image processing apparatus 101 and to transmit the data. For example, the image data may have a configuration where all or part thereof is stored in a storage area of another device connected to the network 103. In this case, the portable terminal 102 receives, via the image processing apparatus 101, all or part of the image data stored in the another device on the network 103.

Figure 7:
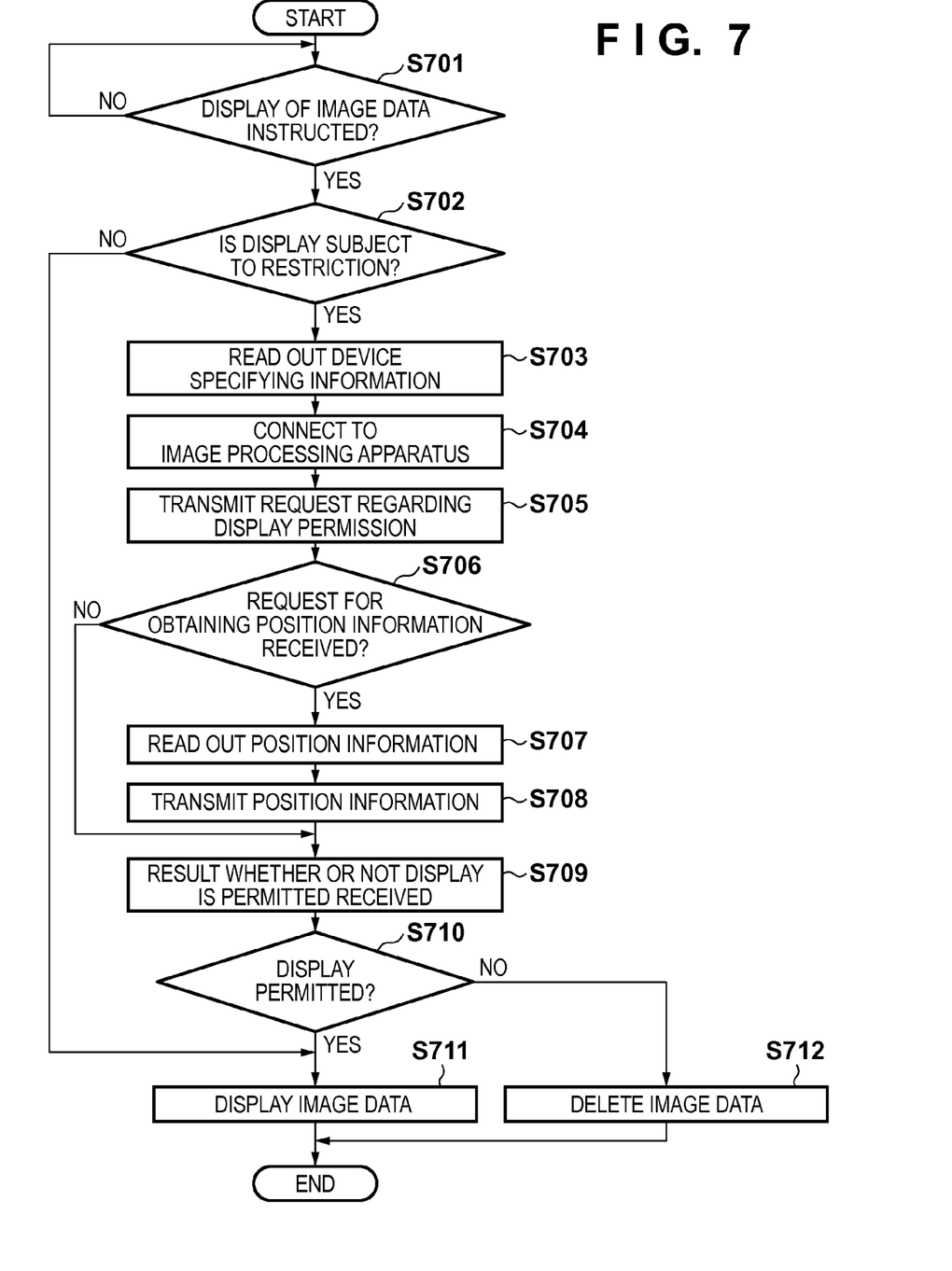
FIG. 7 is a flowchart illustrating data display processing performed in the portable terminal.

A series of processing steps performed when the image data received by the portable terminal 102 is displayed on the operation unit 207 will now be described with reference to the flowchart illustrated in FIG. 7. Note that the processing (procedure illustrated in the flowchart) is processing that is stored in any of the storage areas of the control unit 205, such as the ROM 202, the RAM 203, or the HDD 204, and is executed by the CPU 201.

In step S701, the control unit 205 of the portable terminal 102 determines whether or not the user instructed the display of the image data via the operation unit 207. If it is determined that the display of the image data was instructed, the procedure advances to step S702, and otherwise, the processing waits in step S701 until the display of the image data is instructed.

In step S702, the control unit 205 of the portable terminal 102 determines whether or not the data to be displayed is data whose display is subject to the restriction. If it is determined that the display of the data is subject to the restriction, the procedure advances to step S703, and otherwise, the procedure advances to step S711. In the present example, the determination of whether or not the display of data is restricted is made on the basis of the value of the security settings 303 in the meta data.

That is, it is possible to set the display restriction for each type of data, i.e., each field individually, so that, with respect to each type of data, it is set whether or not the display thereof is subject to the restriction. However, no display restriction is necessary to be imposed on a field that is not displayed anyway. Therefore, according to the security settings 303, it is possible, for example, to determine that the display of the file name 301 is not subject to the restriction whereas the display of the image 305 is subject to the restriction. Note that the explanation of FIG. 7 is made giving only the image data 305 as an example. Although descriptions of other fields such as the file name 301 are omitted, the determination of whether or not such fields are displayed is made in the same manner as that of the image data. In order to perform the determination, for example, the processes after step S702 may be performed for each field or an inquiry as to whether or not the display of each field, whose display is restricted, is permitted may be sent to the server and, in accordance with the response to the inquiry, the display may be performed.

In step S703, the control unit 205 of the portable terminal 102 reads out from the storage area the device specifying information 304 associated with the data to be displayed, and the procedure advances to step S704. In step S704, using the device specifying information 304 that was read out, the control unit 205 of the portable terminal 102 connects via the communication unit 206 to the image processing apparatus 101 that transmitted the data, and the procedure advances to step S705.

In step S705, the control unit 205 of the portable terminal 102 transmits to the image processing apparatus 101 a request regarding data display permission, and the procedure advances to step S706. The request regarding data display permission is a request in which the portable terminal 102 transmits to the image processing apparatus 101 information on the data to be displayed so as to request the image processing apparatus 101 to send back a display permission result. The information on the data to be displayed is information for uniquely specifying the data and is, for example, a file name and creation date and time.

In step S706, the control unit 205 of the portable terminal 102 determines whether or not the portable terminal 102 received from the image processing apparatus 101 via the communication unit 206 a request for transmitting position information. If it is determined that the portable terminal 102 has received the request for transmitting the information, the procedure advances to step S707, and otherwise, the procedure advances to step S709.

In step S707, the control unit 205 of the portable terminal 102 reads out the position information relating to the portable terminal 102 from the position information acquisition unit 208, and the procedure advances to step S708. In step S708, the control unit 205 of the portable terminal 102 transmits the position information to the image processing apparatus 101 via the communication unit 206, and the procedure advances to step S709.

In step S709, the control unit 205 of the portable terminal 102 receives from the image processing apparatus 101 the display permission result, and the procedure advances to step S710. In step S710, the control unit 205 of the portable terminal 102 determines whether or not the display of the data is permitted on the basis of the received result. If it is determined that the display of the data is permitted, the procedure advances to step S711, and otherwise, the procedure advances to step S712.

In step S711, the control unit 205 of the portable terminal 102 displays the data on the image display screen 500, and ends the series of processing steps and returns to the original processing. On the other hand, in step S712, the control unit 205 of the portable terminal 102 deletes the data requested to be displayed, which is stored in the storage area of the portable terminal 102, and ends the series of processing steps and returns to the original processing. As described above, although the present example has described image data as the object to be displayed, it may also be determined for any other field, such as the file name, whether or not the display thereof is permitted. Needless to say, it is also possible to determine only for the image data whether or not the display thereof is permitted.

Figure 5:
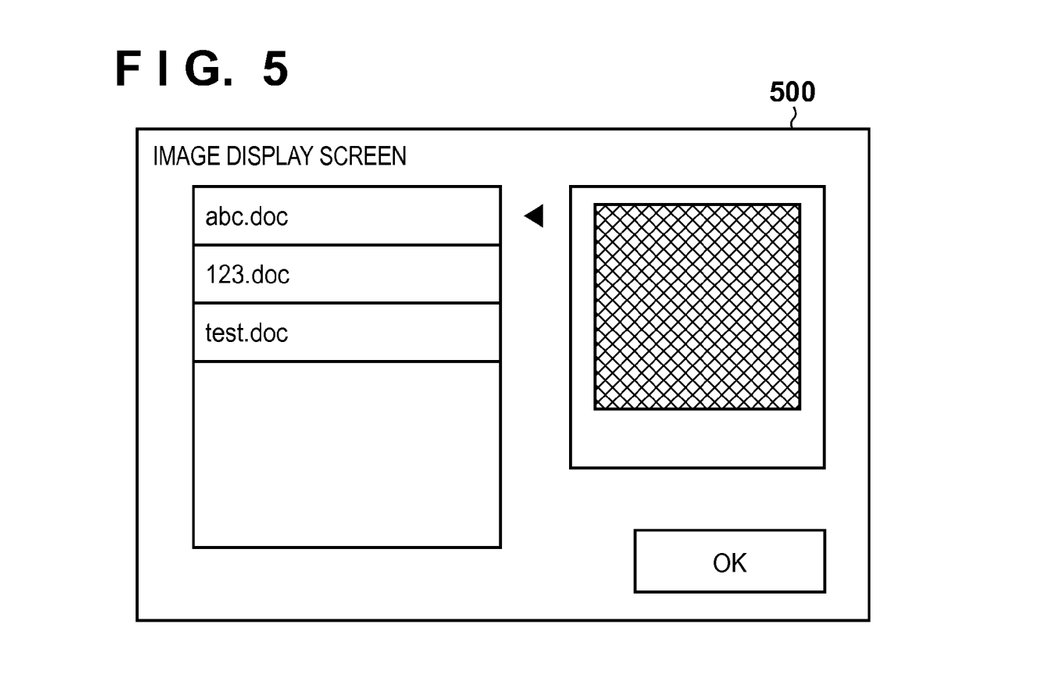
FIG. 5 is a diagram illustrating an example of an image display screen of the portable terminal.

Now, an example of an image display screen displayed on the operation unit 207 of the portable terminal 102 is illustrated in FIG. 5. Meta data including the file name 301 of the image data and the image 305 associated with the image data are displayed on the image display screen 500 of the operation unit 207. In FIG. 5, it is set that the display of the meta data including the file name 301 is not subject to the restriction, and that the display of the image 305 is subject to the restriction. Further, it has been determined in the process of FIG. 7 that the display of the image data having the file name "abc-.doc" is not permitted, so that an object that indicates that the display is not permitted is displayed instead of the deleted image data.

The determination in the above-mentioned processing whether or not the display of the data is subject to the restriction is carried out based on a determination condition for determining whether or not the portable terminal 102 communicates with the image processing apparatus 101 so as to inquire as to whether or not the display of the data is permitted. Although the description has been made giving the example of determination of whether or not the display of the data is subject to the restriction, the present embodiment may of course be configured such that it is determined whether or not communication is to be performed.

In this case, after performing the communication, no inquiry to determine whether or not the display of the data is permitted is needed. For example, if the number of times that the data is processed is to be counted by the image processing apparatus 101, it is set that communication is necessary with regard to the data, so that, when the portable terminal 102 processes the data, the portable terminal 102 first communicates with the image processing apparatus 101 and then processes the data.

When the portable terminal 102 is connected to the image processing apparatus 101, the image processing apparatus 101 determines which data is being processed and increments a counter that corresponds to the data. Such an example can also be attained by the present embodiment. Note that the processing performed on data is not limited to the display processing, and the present invention is applicable to any processing, such as data treatment processing.

Further, although the present embodiment is configured such that for each type of data it is set whether or not the display thereof is subject to the restriction, other configurations are also possible. For example, by referencing the security settings 303, which is one piece of meta data associated with the data, it may be determined whether or not the display of the data is subject to the restriction may be made. Note here that, when the set value stored as the security settings 303 indicates that the display of the data is restricted, it is determined that the display of the corresponding image data or the image 305 included in the image data is subject to the restriction. Whereas when the setting indicates that the display of the data is not restricted, it is determined that the display of the corresponding image data or the image 305 included in the image data is not subject to the restriction.

By determining with the use of the above-mentioned processing whether or not image data is data whose display is restricted when the image data is to be displayed on the operation unit 207 of the portable terminal 102, it is possible to impose a restriction on the display of the image data. This prevents the image data, whose display is to be restricted, from being displayed, thereby effectively improving security.

Further, by switching whether to communicate or not according to the content of the data to be displayed, it is possible to reduce the packet size in network communication. Furthermore, the processing speed can be increased as no communication is performed, so that the effect is brought about that processing can be performed more efficiently. For example, a configuration can be attained in which a file name that is associated with the image data is displayed without restriction because it is lowly-confidential information, whereas the display of the image 305 associated with the image data is restricted because it is highly-confidential information.

Furthermore, when the portable terminal 102 and the image processing apparatus 101 communicate with each other, the use of the device specifying information 304 obtained in advance allows them to easily communicate with each other, making it possible to effectively improve simplicity.

Furthermore, data whose display is not permitted is deleted from the storage area, which effectively improves security.

Moreover, although in the above procedure, an example has been described of a configuration in which the data of a single image is to be displayed, other configurations may also be possible. For example, it is conceivable that a plurality of images is displayed together as thumbnail images of the image data. In this case, it may be configured that one communication process is performed with respect to a plurality of pieces of image data together, rather than with respect to each piece of image data individually. This leads to a reduction in the number of communication processes, making faster processing possible.

Figure 8:
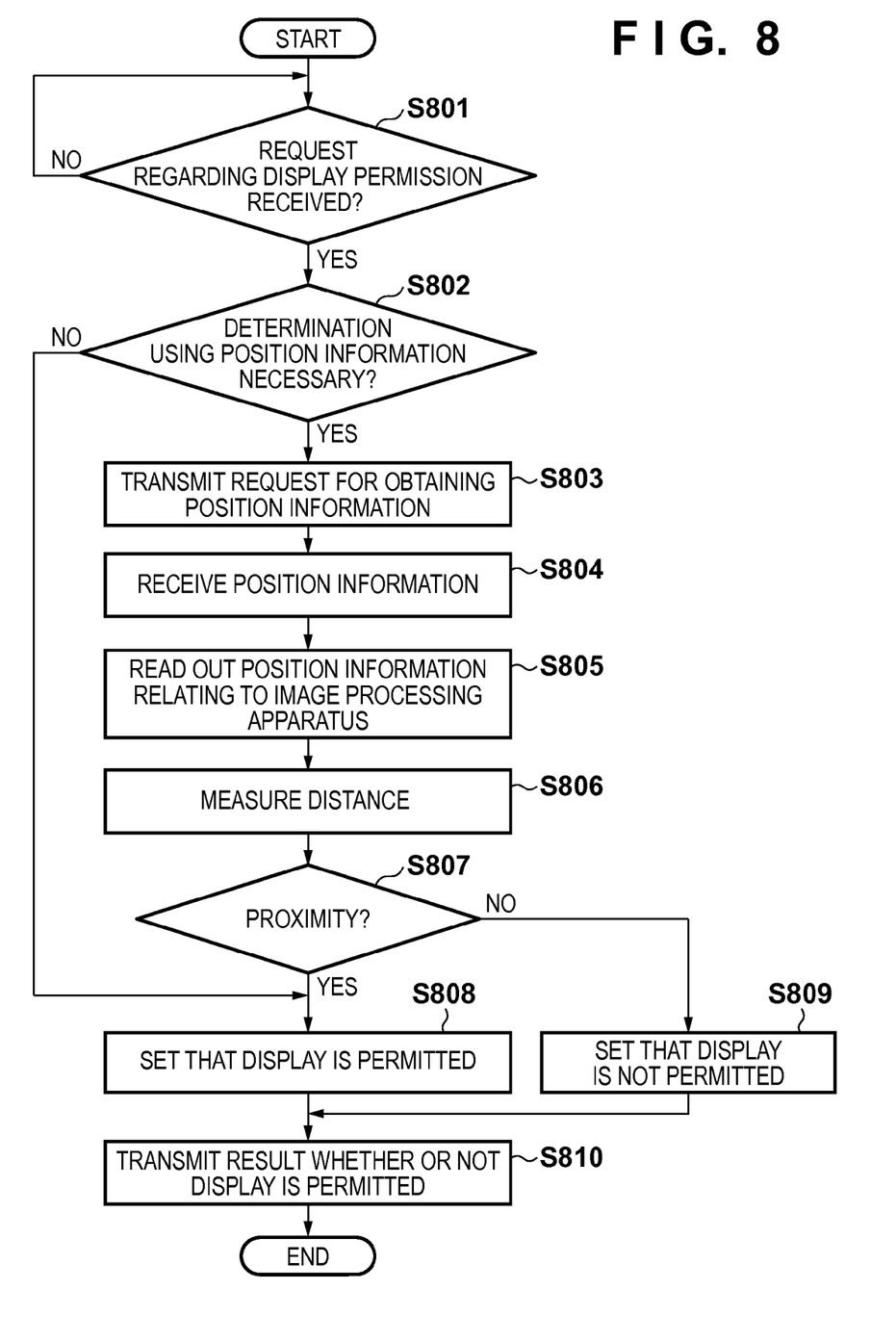
FIG. 8 is a flowchart illustrating processing for determining whether or not display is permitted performed in the image processing apparatus.

A series of processing steps will now be described with reference to the flowchart illustrated in FIG. 8, in which the image processing apparatus 101 receives from the portable terminal 102 the request regarding data display permission, and the control unit 205 of the image processing apparatus 101 determines whether or not the display of the data is permitted and transmits the display permission result. The processing (procedure illustrated in the flowchart) is processing that is stored in any of the storage areas of the control unit 205, such as the ROM 202, the RAM 203, or the HDD 204, and is executed by the CPU 201.

In step S801, the control unit 205 of the image processing apparatus 101 determines whether or not the image processing apparatus 101 has received the request regarding data display permission via the communication unit 206. If it is determined that the image processing apparatus 101 has received the request regarding data display permission, the procedure advances to step S802, and otherwise, the processing waits in step S801 until the image processing apparatus 101 receives the request regarding data display permission. Note that the request regarding data display permission is to request a result as to whether or not the display of the designated data is permitted.

In step S802, the control unit 205 of the image processing apparatus 101 determines whether or not the use of the position information relating to the portable terminal 102 and the position information relating to the image processing apparatus 101 is necessary for the determination of whether or not the display of the designated data is permitted. If it is determined that the determination using the position information is necessary, the procedure advances to step S803. Otherwise, the procedure advances to step S808. The necessity of determination using the position information may be set in advance for each piece of the image data for example. Alternatively, it is possible to set not only the presence or absence of display restriction, but also levels of display restriction, for example, with respect to the security settings 303 of the meta data, and, for each level, the necessity of the determination using the position information in the image processing apparatus 101 may be set in advance.

In step S803, the control unit 205 of the image processing apparatus 101 transmits to the portable terminal 102, via the communication unit 206, a request for transmitting position information to the image processing apparatus 101, and the procedure advances to step S804. In step S804, the control unit 205 receives the position information that was transmitted from the portable terminal 102 via the communication unit 206, and the procedure advances to step S805.

In step S805, the control unit 205 of the image processing apparatus 101 reads out the position information relating to the image processing apparatus 101 from the position information acquisition unit 208, and the procedure advances to step S806. In step S806, the control unit 205 measures the distance between the image processing apparatus 101 and the portable terminal 102, and the procedure advances to step S807. Note that, in the case of wireless communication, the distance is a physical distance on the basis of the position information, whereas in the case of wired communication, the distance can be the number of router hops according to the IP protocol. That is, the physical or logical distance may be measured as a numerical value.

In step S807, if the control unit 205 of the image processing apparatus 101 determines that the distance measured in step S806 is greater than a certain value that was set in advance in the image processing apparatus 101, the procedure advances to step S809. Otherwise, that is, if it is determined that the portable terminal 102 is in proximity to the image processing apparatus 101, the procedure advances to step S808. In step S808, the control unit 205 sets the display permission result to "display permitted", and the procedure advances to step S810. On the other hand, in step S809, the control unit 205 sets the display permission result to "display prohibited", and the procedure advances to step S810.

In step S810, the control unit 205 of the image processing apparatus 101 transmits the display permission result to the portable terminal 102 via the communication unit 206, and ends the series of processing steps and returns to the original processing.

With the above-mentioned processing, if it is determined that the logical distance between the image processing apparatus 101 and the portable terminal 102 is far, it is possible to restrict the display of the designated data. For example, when the image processing apparatus 101 and the portable terminal 102 are located within a certain distance, then the display of the image 305 that is associated with the image data transmitted from the image processing apparatus 101 to the portable terminal 102 may be permitted, whereas when the image processing apparatus 101 and the portable terminal 102 are not located within a certain distance, then the display of the image 305 is prohibited.

This allows restricting data from being viewed on a portable terminal 102 that is no longer under the supervision, preventing leak of information, and effectively improving security.

Although, as the method for determining whether or not the image processing apparatus 101 and the portable terminal 102 are in proximity to each other, the method for determining the distance on the basis of the position information relating to the portable terminal 102 and the position information relating to the image processing apparatus 101 has been described, other methods for the determination may be used. For example, a method may be used that determines that they are located in proximity to each other in the case where the portable terminal 102 and the image processing apparatus 101 can communicate with each other, but determines that they are not located in proximity to each other in the case where they cannot communicate with each other.

Further, although in the present embodiment, a configuration was described as an example, in which the portable terminal 102 and the image processing apparatus 101 are connected to each other via a network 103, other configurations may also be used. For example, the portable terminal 102 and the image processing apparatus 101 may be configured to be directly connected to each other via NFC, Transfer Jet (a trademark or registered trademark), and Bluetooth (a trademark or registered trademark).

Furthermore, although the image data is displayed if it is determined that no determination using the position information in step S802 is necessary, it may be configured that, since in this case the display of the image data is restricted, the processing branches to step S809 giving a priority to the restriction, so that the image data is not displayed. In addition, it may be configured that the processing in step S802 branches unconditionally to step S803.

Moreover, although the present embodiment has described the display processing as an example of a predetermined processing, it is also possible to perform the similar processes with respect to data treatment processing, printing processing, and the like, so as to restrict the processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-025533, filed Feb. 8, 2012, which is hereby incorporated by reference herein in its entirety.

What is claimed is:

1. A data processing system wherein a server and a terminal are connected to each other,
the server comprising:
a transmitting unit configured to transmit image data to the terminal, the transmitted image data including security settings and meta data, wherein the security settings indicate whether or not each display processing of the image data and the meta data is restricted; and
a responding unit configured to respond, based on a distance between the server and the terminal when a display processing of the image data is instructed by a user of the terminal, to an inquiry from the terminal whether or not the display processing of the image data is permitted, the terminal comprising:
a receiving unit configured to receive the image data transmitted from the transmitting unit of the server, the received image data including the security settings and the meta data;
a storage configured to storing the image data received by the receiving unit, the stored image data including the security settings and the meta data;
a determining unit configured to determine based on the security settings, when the display processing of the stored image data and the meta data is instructed by the user of the terminal, whether or not each display processing of the stored image data and the meta data is restricted;
an inquiring unit configured to inquire of the server whether or not each display processing of the stored image data and the meta data is permitted for the terminal, if it is determined by the determining unit the display processing of the stored image data and/or the meta data is restricted; and
a performing unit configured to perform or not perform each display processing of the stored image data and the meta data in accordance with the response to the inquiry.

2. The data processing system according to claim 1,
wherein the server requests, in response to the inquiry, position information relating to the terminal,
the terminal transmits the position information to the server in accordance with the request, and
the server determines the distance between the server and the terminal on the basis of the position information received from the terminal, and permits display processing of the image data and the meta data if the distance is within a predetermined range, and does not permit display processing of the image data and the meta data when the distance is not within a predetermined range.

3. The data processing system according to claim 1,
wherein the performing unit deletes the image data and does not perform the display processing of the image data and the meta data, if the response to the inquiry indicates that the display processing of the image data and the meta data is not permitted.

4. A terminal connected to a server, where in the server comprising:

a transmitting unit configured to transmit image data to the terminal, the transmitted image data including security settings and meta data, wherein the security settings indicate whether or not each display processing of the image data and the meta data is restricted, and a responding unit configured to respond, based on a distance between the server and the terminal when a display processing of the image data is instructed by a user of the terminal, to an inquiry from the terminal whether or not the display processing of the image data is permitted, and wherein the terminal comprising:

a receiving unit configured to receive the image data transmitted from transmitted unit of the server, the received image data including the security settings and the meta data;

a storage configured to storing the image data received by the receiving unit, the stored image data including the security settings and the meta data;

a determining unit configured to determine based on the security settings, when the display processing of the stored image data and the meta data is instructed by the user of the terminal, whether or not each display processing of the stored image data and the meta data is restricted; and an inquiring unit configured to inquire of the server whether or not each display processing of the stored image data and the meta data is permitted for the terminal, if it is determined by the determining unit that the display processing of the stored image data and/or the meta data is restricted: and a performing unit configured to perform or not perform each display processing of the stored image data and the meta data in accordance with the response to the inquiry.

5. A non-transitory computer readable medium in which a program is stored for causing a computer to function as a terminal according to claim 4.

6. A server connected to a terminal, wherein the server comprising:

a transmitting unit configured to transmit image data to the terminal, the transmitted image data including security settings and meta data, wherein the security settings indicate whether or not each display processing of the image data and the meta data is restricted, and a responding unit configured to respond, based on a distance between the server and the terminal when a display processing of the image data is instructed by a user of the terminal, to an inquiry from the terminal whether or not the display processing of the image data is permitted, and wherein the terminal comprising:

a receiving unit configured to receive the image data transmitted from the transmitting unit of the server, the received image data including the security settings and the meta data;

a storage configured to store the image data received by the receiving unit, the stored image data including the security settings and the meta data;

a determining unit configured to determine based on the security settings, when the display processing of the stored image data and the meta data is instructed by the user of the terminal, whether or not each display processing of the stored image data and the meta data is restricted, and an inquiring unit configured to inquire of the server whether or not each display processing of the stored image data and the meta data is permitted for the terminal, if it is determined by the determining unit that the display processing of the stored image data and/or the meta data is restricted; and a performing unit configured to perform or not perform each display processing of the stored image data and the meta data in accordance with the response to the inquiry

7. A non-transitory computer readable medium in which a program is stored for causing a computer to function as a server according to claim 6.

8. A method for processing data performed in a data processing system in which a server and a terminal are connected to each other, the method comprising:

the server transmitting the image data to the terminal, the transmitted image data including security settings and meta data, wherein the security settings indicate whether or not each display processing of the image data and the meta data is restricted;

the terminal receiving the image data transmitted from the server, the received image data including the security settings and the meta data;

the terminal storing the received image data, the stored image data including the security settings and the meta data the terminal determining based on the security settings, when the display processing of the stored image data and the meta data is instructed by a user of the terminal, whether or not each display processing of the stored image data and the meta data is restricted;

the terminal inquiring of the server whether or not each display processing of the stored image data and the meta data is permitted for the terminal if it is determined that the display processing of the stored image data and/or the meta data is restricted, the server responding, based on a distance between the server and the terminal when a display processing of the image data is instructed by the user of the terminal, to the inquiry from the terminal whether or not the display processing of the image data is permitted; and the terminal performing or not performing each display processing of the stored image data and the meta data in accordance with the response to the inquiry.

\* \* \* \* \*